ELECTRONIC MULTIPLE COMPARATOR

Filed Nov. 25, 1953

INVENTORS.
MARC SHIOWITZ,
BY HOWARD M. ROBBINS,
Seymour M. Rosenberg
HIS ATTORNEY.

United States Patent Office 2,821,696
Patented Jan. 28, 1958

2,821,696

ELECTRONIC MULTIPLE COMPARATOR

Marc Shiowitz and Howard M. Robbins, Los Angeles, Calif., assignors, by mesne assignments, to Hughes Aircraft Company, a corporation of Delaware Application November 25, 1953, Serial No. 394,439
8 Claims. (Cl. 340—149)

Figure 1:
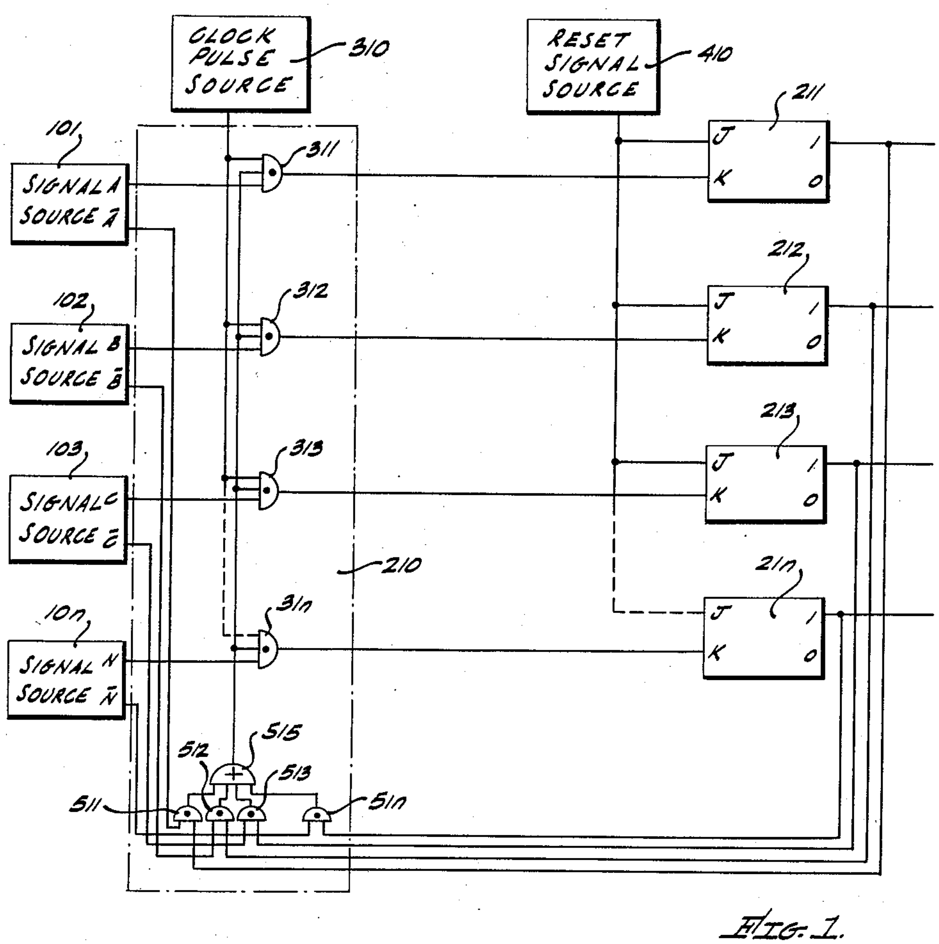

This invention relates to an electronic multiple comparator, and more particularly, to an electronic multiple comparator for comprising and indicating the relative magnitudes of a plurality of binary numbers represented by a plurality of sets of binary coded electrical digit signals, respectively, by comparing the relative magnitude of corresponding digit signals.

In copending U. S. application for patent, Serial No. 394,441, for "Electronic Magnitude Comparator," filed November 25, 1953, by Robert R. Johnson, there is disclosed a system for comparing and indicating the relative magnitudes of two binary numbers. According to the basic concept of the Johnson invention, the relative magnitudes of two weighted binary numbers are directly indicated by the sense of the nonidentity of the most significant nonidentical corresponding digits of the two numbers. The Johnson application discloses a number of systems for making use of this principle to carry out the comparison of two binary numbers.

The present invention discloses further improvements in comparators based upon the same basic concepts as the Johnson system wherein, however, the comparison processes are extended to the simultaneous comparison of a plurality of binary numbers and the instantaneous indication of the relative magnitudes of the numbers being compared. More specifically, the present invention relates to a comparator for comparing a plurality of weighted binary numbers and instantaneously indicating the largest or the smallest of the numbers as soon as the relative magnitudes of the numbers have been established.

The comparator of the present invention provides that the comparison process be carried out by comparing signals representing corresponding digits of the numbers in the order of most significant digit signals first. The comparator includes one output channel for each of the numbers being compared and, initially, an output signal is provided on each output channel. As each set of successive digit signals is applied to the comparator, output signals are removed from the channels corresponding to numbers larger or smaller than the remaining numbers, according to the desired comparison. Accordingly, at the conclusion of the comparison operation output signals remain on the channel corresponding to the smallest or largest of the numbers. Where a plurality of the numbers are identical, and smaller or larger than the remaining numbers being compared, an output signal is provided on each of the output channels corresponding to the identical numbers.

The comparator of the present invention is directly applicable to the comparison of binary numbers which may be arranged in order of relative magnitudes according to a weighting scheme whereby values of magnitude are assigned to each digit of the number. In particular, the comparator is applicable to the comparison of multi-digit binary numbers in which particular digits of the number carry the same or greater weight than digits less significant. Among the more common binary systems of enumeration in use at the present time which fall within this group are the positional binary code, the excess 0, 1, 2, 3, 4, 5, 6 binary codes, the binary coded decimal code, etc. Numbers expressed according to this definition will be referred to as "weighted binary numbers."

It is, therefore, an object of the present invention to provide an electronic magnitude comparator for comparing and indicating the relative magnitudes of a plurality of binary numbers represented as a plurality of sets of binary coded electrical digit signals, respectively, by comparing the relative magnitudes of corresponding digit signals.

Another object of the present invention is to provide a system for comparing and indicating the largest, or alternatively the smallest of a plurality of weighted binary numbers represented by a plurality of sets of binary coded electrical digit signals, respectively, by comparing the relative magnitudes of corresponding digit signals.

A further object of the present invention is to provide an electronic comparator which sequentially compares corresponding digit signals of a plurality of sets of binary coded electrical digit signals representing a plurality of numbers, respectively, and instantaneously indicates the largest or the smallest of the numbers.

It is yet another object of the present invention to provide an electronic magnitude comparator for comparing and indicating the largest or the smallest of a plurality of numbers expressed as sets of binary coded electrical digit signals, respectively, wherein the comparison operation is discontinued once the largest or the smallest of the numbers has been recognized.

The novel features which are believed to be characteristic of the invention, both as to its organization and method of operation, together with further objects and advantages thereof, will be better understood from the following description considered in connection with the accompanying drawing in which one embodiment of the invention is illustrated by way of example. It is to be expressly understood, however, that the drawing is for the purpose of illustration and description only, and is not intended as a definition of the limits of the invention.

Figure 2:
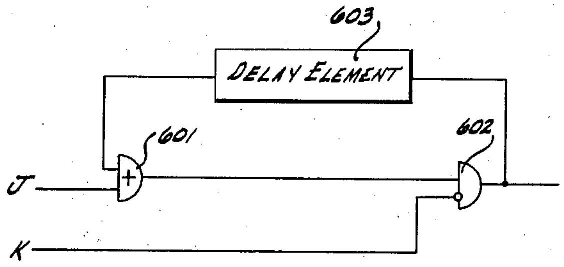

Fig. 1 is a block diagram of an electronic magnitude comparator according to the present invention; and Fig. 2 is a block diagram illustrating an alternative component for the comparator of Fig. 1.

Referring now to the drawings, there is shown in Fig. 1 an electronic magnitude comparator according to the present invention which provides for the comparison of a plurality of weighted binary numbers and the indication of the smallest of the numbers. As shown in Fig. 1, the comparator includes a plurality of input signal sources 101, 102, 103 and **10*n* for supplying complementary electrical signal sets A, $\overline{A}$, B, $\overline{B}$, C, $\overline{C}$ and N, $\overline{N}$, representing the numbers to be compared, respectively, to a gating matrix 210 which in turn supplies input signals to a plurality of bistable elements 211, 212, 213 and 21*n* for indicating the results of the comparison operation. Each of the bistable elements also receives input signals from a reset signal source 410 and supplies an output signal to gating matrix 210 which also receives clock or comparison pulses from a clock pulse source 310**.

More specifically, the input signal sets supplied by sources 101, 102, 103 and **10*n*** represent first, second, third and *n*th numbers to be compared and include one signal for each digit of the number represented, the signals being supplied in the order of most significant digit signal first, corresponding digit signals at the same time. The signals supplied may be bivalued voltage level signals, in which case a "1" digit may be represented by a signal of relatively high voltage level, while a "0" digit may be represented by a signal of relatively low voltage level. On the other hand, the signals may be pulse signals, a "1" digit being represented by the presence of a pulse while a "0" digit is represented by the absence of a pulse. The signals presented on output terminals A, B, C and N represent the digits of the numbers directly while the signals presented on output terminals $\overline{A}$, $\overline{B}$, $\overline{C}$ and $\overline{N}$ represent the complements of the digits presented on the corresponding nonbar output terminal. In other words, a "0" digit signal is presented on a barred output terminal when a "1" digit signal is presented on the corresponding nonbarred output terminal and vice versa.

Input signal sets A, B, C and N are supplied to a plurality of logical "and" gates 311, 312, 313 and **31*n*, respectively, of gating matrix 210. The logical "and" gates, which may be similar to the diode logical "and" gates described in copending U. S. Patent application, Serial Number 305,955, for "Electronic Gate," by Eldred C. Nelson, filed August 23, 1952, are three-terminal logical "and" gates and receive in addition to their respective input signals from the corresponding input signal source, clock pulses from source 310 and control signals from a logical "or" gate 515, which will be further defined in the discussion which follows. Each logical "and" gate is responsive to the application of corresponding "1" signals from its corresponding input signal source and logical "or" gate 515 to pass a simultaneously applied clock pulse from source 310** to its output terminal.

The output terminals of logical "and" gates 311, 312, 313 and **31*n* are connected to the K input terminals of bistable elements 211, 212, 213 and 21*n*, respectively, the J input terminals of the bistable elements being connected to reset signal source 410. Bistable elements 211, 212, 213 and 21*n***, which may be conventional Eccles-Jordan multivibrators, are responsive to signals applied to their K input terminals to set to one of their stable states, which will be denominated the "0" stable state, and to signals applied to their J input terminals to set to the other of their stable states, which will be denominated the "1" stable state. Each bistable element has an output terminal upon which a signal of comparatively high voltage level is produced when the bistable element is in its "1" state and of comparatively low voltage level when the element is in its "0" state. In accordance with the notation previously adopted, these signals will be referred to as "1" and "0" signals, respectively, hereafter.

The output terminals of bistable elements 211, 212, 213 and **21*n*, in turn are connected to a plurality of logical "and" gates 511, 512, 513 and 51*n*, respectively. Each logical "and" gate, which may be similar to the diode logical "and" gates heretofore described, receives a complementary input signal from one of input signal sources 101, 102, 103 and 10*n* and is responsive to "1" signals applied to both of its input terminals to produce a "1" output signal. The complementary signal applied to each logical "and" gate is that from the input signal source associated with the bistable element from which the "and" gates other input signal is derived. For example, "and" gate 511 receives the output signal from bistable element 211 and signal $\overline{A}$ from source 101**.

The output terminals of logical "and" gates 511, 512, 513 and **51*n*, in turn, are connected to the input terminals of logical "or" gate 515. This gate may be similar to the logical diode "or" gates described in copending U. S. Patent application, Serial No. 327,133, for "Diode, Pulse Gating Circuits," by Richard D. Forrest, filed December 20, 1952, now Patent No. 2,762,936, and is responsive to the application of a "1" input signal to any of its input terminals to produce a "1" output signal on its output terminal. As has been mentioned previously, the output terminal of logical "or" gate 515 is connected to one input terminal of each of logical "and" gates 311, 312, 313 and 31*n***.

The operation of the system thus described may be better understood by first considering the response of the system when used to compare and indicate the smaller of two weighted binary numbers. An embodiment of the invention for carrying out such a comparison operation need only include two input signal sources, two bistable elements and the logical gating circuits associated therewith. In the discussion which follows, it will be assumed that the embodiment includes only input signal sources 101 and 102, bistable elements 211, 212 and the logical gating and control circuits associated therewith.

Considering now the operation of the system thus described, prior to the initiation of the comparison operation, bistable elements 211 and 212 are set to their "1" stable states by means of reset signals applied to their J input terminals from reset signal source 410. To carry out the comparison operation, input signal sources 101 and 102 may apply the signals representing the two numbers to gating matrix 210 in the order of most significant digit signals first, corresponding signals being applied at the same time. Upon the application of each pair of input digit signals, clock pulse source 310 applies a clock pulse to each of gates 311 and 312.

If the input signals presented by input signal sources 101 and 102 represent corresponding "0" digits, a "0" signal will be applied to each of gates 311 and 312 and the applied clock pulse will not be passed by either gate. If the digit signals presented by input signal sources 101 and 102 represent corresponding "1" digits, "0" signals will be applied to each of logical gates 511 and 512 and accordingly, logical "or" gate 515 will produce a "0" output signal thus inhibiting the passing of a clock pulse by either gate 311 and 312. It will thus be seen that so long as corresponding digit signals are supplied by input signal sources 101 and 102, neither gate 311 nor gate 312 will pass a clock pulse, and, therefore, neither of bistable elements 211 or 212 will be changed from its original setting.

However, upon the application of nonidentical digit signals from the input signal sources, the conditions required for the passing of a pulse by logical gate 311 or 312 will be satisfied and one of the bistable elements will be set to its "0" state. Assume first that the digits are dissimilar in the sense that input signal source 101 presents signals representing a "1" digit while input signal source 102 presents signals representing a "0" digit. It will be seen that the "0" signal appearing on the B terminal of source 102 inhibits the passing of pulses by gate 312 while, at the same time, the "1" signal supplied from the $\overline{B}$ terminal of signal source 102 to gate 512 produces a "1" output signal at gate 512. Accordingly, gate 515 produces a "1" output signal. The occurrence of a "1" output signal at both inputs to logical gate 311 causes the gate to pass a clock pulse and, accordingly, bistable element 211 is set to its "0" state.

Once bistable element 211 has been set to its "0" state, its setting will not thereafter be changed until reset signals are again applied to its J input terminal. In addition, the setting of bistable element 211 to its "0" state inhibits the further response of gate 511 and accordingly, gate 515 will gain produce a "1" output signal only if gate 512 produces a "1" output signal, that is if input signal source 102 produces a "1" output signal on its $\overline{B}$ output terminal. Since input signal source 102 can never produce a "1" output signal on both its B and $\overline{B}$ output terminals simultaneously, the conditions under which "and" gate 312 passes a clock pulse will never be satisfied and bistable element 212 will thereafter remain in its "1" state.

In a similar manner, it can be shown that if the first applied dissimilar digit signals are dissimilar in the opposite sense, that is, the signal presented by source 101 represents a "0" digit while the signal presented by source 102 represents a "1" digit, bistable element 212 will be set to its "0" state, while bistable element 211 remains in its "1" state, and the system is rendered nonresponsive to the application of further input signals. It will thus be seen that once nonidentical signals are applied to the system, the response of the system to the application of further digit signals is effectively inhibited.

The setting of bistable elements 211 and 212, once nonidentical corresponding digit signals are applied to the system, may be interpreted as a direct indication of the relative magnitudes of the two numbers being compared. Thus, it will be seen that the bistable element corresponding to the input signal source which presents the "0" digit signal of the first occurring dissimilar pair of digits remains in its "1" state throughout the comparison operation, while the bistable element corresponding to the input signal source which presents the "1" digit signal of the first occurring dissimilar pair of digits is set to its "0" state by the comparison operation.

As heretofore pointed out in the discussion of the binary system of enumeration, and as more fully discussed in the aforementioned Johnson application, the sense of the nonidentity of the most significant dissimilar pair of corresponding digits of two weighted binary numbers is a direct indication of the relative magnitudes of the two numbers. In other words, the "1" digit of the dissimilar pair occurs in the larger of the two numbers while the "0" digit of the dissimilar pair occurs in the smaller of the two numbers. Accordingly, the final setting of the bistable elements may be interpreted as indicating the relative magnitudes of the two numbers, the "1" set bistable element indicating that the corresponding input signal has represented a smaller number than the "0" set bistable element. The smaller of the two numbers being compared will thus be seen to be indicated by the appearance of a "1" or relatively high voltage level signal on the output terminal of the corresponding bistable element. As previously discussed, if both of the numbers being compared are identical, neither bistable element will be set to its "0" state and accordingly, both bistable elements will present "1" output signals.

The basic comparison system of the present invention may be enlarged to provide for the simultaneous comparison of a plurality of binary numbers by including additional input signal sources and bistable elements and associated gating circuits within the system. Such an embodiment, shown in Fig. 1, has been previously described.

Considering now the operation of the comparator of Fig. 1 in the light of the previous discussion, bistable elements 211, 212, 213 and **21*n* may be initially set to their "1" stable states by means of reset signals applied to their J input terminals from reset signal source 410. To carry out the comparison operation, input signal sources 101, 102, 103 and 10*n* may apply the signals representing numbers A, B, C and N to gating matrix 210 in the order of most significant digit signals first, corresponding digit signals being applied at the same time. Upon the application of each group of input digit signals, clock pulse source 310** applies a clock pulse to the logical "and" gates to which it is connected. The system will be responsive to the applied input signals in a manner analogous to that of the two number comparator previously described.

Accordingly, the application of similar "1" or "0" digit signals from all of the input signal sources will produce no response within the system. However, upon the occurrence of a nonidentity between any two or more input signals, the bistable elements corresponding to applied "1" input digit signals will be set to their "0" states while the bistable elements which receive "0" input signals will remain in their "1" states. The setting of a particular bistable element to its "0" state will render that element insensitive to the application of further input signals and also cause the element to produce a "0" or relatively low voltage output signal. The "and" gate which receives the output of such a particular bistable element will be inhibited and, accordingly, the conditions under which "or" gate 515 produces a "1" output signal will not be further satisfied by the input signals corresponding to the "0" set bistable element. The comparison process will continue with respect to the numbers corresponding to bistable elements which have not been set to their "0" state until all but one of the bistable elements remains in its "1" state, or until all of the digit signals of the numbers being compared have been applied to the system.

If, during the comparison process, all of the bistable elements except one have been set to their "0" states, the bistable element remaining in its "1" state thereby indicates that the corresponding applied input signals represent the smallest number of the group of numbers compared. It should be noted that this condition may exist before all of the signals representing the numbers have been applied to the comparator and if desired, the comparison operation may be discontinued before all digit signals have been applied. If, however, after all digit signals of the numbers have been applied, more than one of the bistable elements remains in its "1" state, the bistable elements remaining in the "1" state thereby indicate that all of the corresponding input signals have been identical and that this identical input signal represents a number smaller than the numbers applied to any of the "0" set bistable elements.

The multiple comparator shown in Fig. 1 may be utilized to compare and indicate the largest of a plurality of numbers by interchanging the A and $\overline{A}$, B and $\overline{B}$, C and $\overline{C}$, N and $\overline{N}$ inputs, respectively. Considering now the response of the system under this mode of operation, all of the bistable elements may be initially set to their "1" state by the application of a reset signal from reset signal source 410. To carry out the comparison operation, input signal sources 101, 102, 103 and **10*n* may supply signals identical in form to those previously discussed. However, signals $\overline{A}$, $\overline{B}$, $\overline{C}$ and $\overline{N}$ are now applied to gates 311, 312, 313 and 31*a*, respectively, while signals A, B, C and N are applied to gates 511, 512, 513 and 51*n***, respectively.

It will be seen from the previous discussion that any particular bistable element will now be set to its "0" state when the input signal corresponding to that element represents a "0" digit, if at the same time, a "1" digit is represented by the signals from any other input signal source. The setting of any particular bistable element to its "0" state will thus indicate that the number corresponding to that particular bistable element is smaller than a number being applied to one or more of the other input leads.

If, during the comparison process, all of the bistable elements except one have been set to their "0" states, the bistable element remaining in its "1" state thereby indicates that the corresponding applied input signals have represented the largest number of the group of numbers compared. It should be noted that this condition may exist before all of the digit signals representing the numbers have been applied to the comparator and as set forth above, the comparison operation may be discontinued before all digit signals have been applied. If, however, after all digit signals of the numbers have been applied, more than one of the bistable elements remains in its "1" state, the bistable elements remaining in their "1" state thereby indicate that all of the corresponding input signals have been identical and that this identical input signal represents a number larger than the numbers applied to any of the "0" set bistable elements.

While the comparator shown in Fig. 1 has been discussed with particular reference to what is known as voltage level gating, it should be understood that the system may be as readily implemented for pulsing gating, When it is desired to employ pulse techniques throughout the system the bistable elements shown in Fig. 1 may each be replaced by the logical structure shown in Fig. 2, which is similar to the dynamic flip-flop shown and discussed in an article entitled "Dynamic circuit techniques used in SEAC and DYSEAC," by R. D. Elbourn and R. P. Witt at pages 2 through 9 of "The Transactions of the I. R. E. Professional Group on Electronic Computers," for March 1953, volume EC–2, No. 1.

As shown in Fig. 2, the element includes a logical "or" gate 601, a logical inhibition gate 602 and a delay element 603. One of the inputs to logical "or" gate 601 may be denominated the J input. The output terminal of the "or" gate is connected to the normal input terminal of inhibition gate 602, which has its output terminal returned to the remaining input terminal of "or" gate 601 through delay element 603. The inhibition input terminal of gate 602 may be denominated the K input terminal of the element.

Considering the response of the structure thus described, a pulse applied to the J input terminal of logical "or" gate 601 will be passed to its output terminal and thence through the inhibition gate in the absence of a pulse simultaneously applied to the K input terminal of the inhibition gate. This pulse, in turn, will be delayed by delay element 603 and then be applied to the other input terminal of logical "or" gate 601. If it is assumed that the system is lossless, pulses will thereafter appear on the output terminal of gate 602 at intervals equal to the timed delay of delay element 603. However, the application of an appropriately timed pulse to the K input terminal of gate 602 will inhibit the passing of pulses by this gate and, accordingly, once a pulse is applied to the K input terminal, no further pulses will appear on the output terminal of gate 602.

When used to replace the bistable element shown in Fig. 1, the signals formerly applied to the J and K input terminal of the respective bistable elements may be applied to the J and K input terminals of the structure shown in Fig. 2 and the output signal formerly taken from the "1" output terminal of the bistable element may be taken from the output terminal of inhibition gate 602. The delay of delay element 603 may be equal in time to the interval between the application of clock or comparison pulses from source 310. The reset signals supplied from reset signal source 410 may be identical to the clock or comparison pulse supplied from source 310 and may be supplied simultaneously with the application of the first or most significant digit signals. The logical "and" and "or" gates may be similar to the diode "and" and "or" gates heretofore described except that they may now be responsive to "1" and "0" pulse input signals if desired.

The comparator thus described may be used to compare and indicate the relative magnitudes of a plurality of numbers in a manner similar to that discussed in connection with the embodiment shown in Fig. 1. The reset signals applied from reset signal source 410 may be applied to the respective J input terminals of the elements simultaneously with the application of the first or most significant digit signals of the numbers. As long as the applied digit signals are identical, the clock pulses from source 410 will continue to appear on the output terminals of each of the elements at intervals of one pulse time. However, upon the application of nonidentical signals from any of the input sources, an inhibition pulse will be applied to the appropriate input terminal. The inhibition pulse thus applied will inhibit the passing of the circulating clock pulse and pulses will no longer appear on the output terminal of the inhibited bistable element. The final indication of the system will be identical to that of the previous embodiment except that the final output signals will now be clock pulse signals rather than voltage level signals.

While a lossless system has been assumed for this embodiment of the invention, it should be understood that to achieve such a system in practice may require that additional amplifiers and pulse restoring circuits be inserted at various points within the system. Such circuits are well known to the art and are therefore, not considered to represent a departure from the scope of the present invention.

What is claimed as new is:

1. A system for comparing and indicating the relative magnitudes of a plurality of binary numbers expressed as a corresponding plurality of bivalued electrical signal sets, respectively, each signal set including at least one digit signal for each digit of the number represented, said system comprising: a plurality of bistable elements, one element for each signal set; first means coupled to said bistable elements for setting all of said bistable elements to a predetermined one of their stable states; second means coupled to said bistable elements and responsive to corresponding digit signals of said signal sets to change the setting of each one of said bistable elements to the other of its stable states when the digit signal associated with said one bistable element is dissimilar in one sense from another corresponding digit signal; and third means coupled to said second means for rendering said second means responsive to digit signals associated with a bistable element whose setting has not been changed and nonresponsive to digit signals associated with a bistable element whose setting has already been changed.

2. In a system for comparing and indicating the relative magnitudes of first and second binary numbers expressed as first and second bivalued electrical signal sets, respectively, each signal set including a pair of complementary digit signals for each digit of the number represented, the combination comprising: first and second bistable elements, each element producing an output signal when set to a predetermined one of its stable states; means for setting said bistable elements to said one stable state; first and second logical "and" circuits electrically connected to said first and second bistable elements, respectively, each of said logical "and" circuits having first and second input terminals and an output terminal and being responsive to signals applied to said first and second input terminals for producing an output signal on said output terminal to set the associated bistable element to the other of its stable states; means for applying one signal of each pair of complementary digit signals of said first and second sets to the first input terminal of said first and second "and" circuits, respectively; a logical gating matrix for applying a signal to the second input terminal of each of said "and" circuits, said gating matrix including an output terminal connected to the second input terminal of each of said "and" circuits, a two-terminal logical "or" circuit, and first and second two-terminal logical "and" circuits, each having an output terminal connected to an input terminal of said "or" circuit; means for applying the output signal of said first and second bistable elements to one input terminal of said first and second two-terminal logical "and" circuits, respectively; and means for applying the other signal of each of said pairs of complementary digit signals of said first and second sets to the other input terminal of said first and second two-terminal "and" circuits, respectively.

3. In a system for comparing and indicating the relative magnitudes of a plurality of binary members expressed as a plurality of bivalued electrical signal sets, respectively, each signal set including a pair of complementary digit signals for each digit of the number represented, the combination comprising: a plurality of bistable elements, one for each signal set, each element producing an output signal when set to a predetermined one of its stable states; means for setting said bistable elements to said one stable state; a corresponding plurality of logical "and" circuits electrically connected to said plurality of bistable elements, respectively, each of said logical "and" circuits having first and second input terminals and an output terminal and being responsive to signals applied to said first and second input terminals for producing an output signal on said output terminal to set the associated bistable element to the other of its stable states; means for applying one signal of each pair of complementary digit signals of said plurality of sets to the first input terminal of said plurality of logical "and" circuits, respectively; a logical gating matrix for applying a signal to the second input terminal of each of said "and" circuits, said matrix including a logical "or" circuit having a plurality of input terminals and an output terminal connected to the second input terminal of each of said "and" circuits, and a plurality of two-terminal logical "and" circuits, one for each of said bistable elements and its associated signal set, each two-terminal "and" circuit having an output terminal connected to an input terminal of said "or" circuit; means for applying the output signal of each of said bistable elements to one input terminal of the associated two-terminal logical "and" circuit; and means for applying the other signal of each of said pairs of complementary digit signals of each signal set to the other input terminal of the associated two-terminal "and" circuit.

4. A system for comparing and indicating the relative magnitudes of a plurality of binary numbers expressed as a corresponding plurality of bivalued electrical signal sets, respectively, each signal set including a pair of complementary digit signals for each digit of the number represented, said system comprising: a plurality of bistable elements, one for each signal set, each element producing an output signal when set to a predetermined one of its stable states; first means for setting said bistable elements to said one stable state; second means responsive to simultaneous application of a control signal and one signal of each pair of complementary digit signals of each of said plurality of sets to set the corresponding bistable element to the other of its stable states; and means for producing said control signal, said means including a logical gating matrix responsive to simultaneous application of the output signal of each bistable element and the other signal of each of said pairs of complementary digit signals of the corresponding signal set.

5. A system for comparing and indicating the smallest of a plurality of binary numbers, said system comprising: a plurality of input signal sources for supplying a plurality of pairs of complementary bivalued electrical signal sets A, $\overline{A}$, B, $\overline{B}$, C, $\overline{C}$ . . . N, $\overline{N}$, representing in bilevel voltage form first, second, third . . . *n*th numbers to be compared, respectively, each signal set including at least one signal for each digit of the number represented; first, second, third . . . and *n*th bistable elements, one for each pair of signal sets, each bistable element producing an output signal when set to a predetermined one of its stable states; first means for setting said bistable elements to said one stable state; second means responsive to a control signal and to signal sets A, B, C and N, respectively, to set the corresponding first, second, third and *n*th bistable elements to the other of their stable states; and a logical gating matrix for producing said control signal in response to application of each of signal sets $\overline{A}$, $\overline{B}$, $\overline{C}$ and $\overline{N}$ and the output signal produced by the corresponding bistable element.

6. A system for comparing and indicating the largest of a plurality of binary numbers, said system comprising: a plurality of input signal sources for supplying a plurality of pairs of complementary bivalued electrical signal sets A, $\overline{A}$, B, $\overline{B}$, C, $\overline{C}$ . . . N, $\overline{N}$ representing in bilevel voltage form first, second, third . . . *n*th numbers to be compared, respectively, each signal set including at least one signal for each digit of the number represented; first, second, third . . . and *n*th bistable elements, one for each pair of signal sets, each bistable element producing an output signal when set to a predetermined one of its stable states; first means for setting said bistable elements to said one stable state; second means responsive to a control signal and to signal sets $\overline{A}$, $\overline{B}$, $\overline{C}$ and $\overline{N}$, respectively, to set the corresponding first, second, third and *n*th bistable elements to the other of their stable states; and a logical gating matrix for producing said control signal in response to application of each of signal sets A, B, C and N and the output signal produced by the corresponding bistable element.

7. A comparator for comparing signals representative of a plurality of binary numbers and indicating the relative magnitudes of the numbers, said number-representing signals being supplied from a plurality of signal sources including one source for each number to be compared, said comparator comprising: a plurality of bistable elements, one for each signal source, each element producing an output signal when set to a predetermined one of its stable states; first means for setting said bistable elements to said one stable state; a plurality of logical gating circuits, including one circuit for each of said bistable elements, responsive to the simultaneous application of a control signal and a number-representing signal representative of one binary digit from a signal source to set the corresponding bistable element to the other of its stable states; and means for producing said control signal, said means including a logical gating matrix responsive to the simultaneous application of the output signal from one of said bistable elements and a number-representing signal representative of another binary digit from the corresponding signal source to produce said control signal.

8. In a comparator for comparing signals representative of a plurality of binary numbers and indicating the relative magnitudes of the numbers, said number-representing signals being supplied from a plurality of signal sources including one source for each number to be compared, the combination comprising: a plurality of bistable elements, one for each signal source, each element producing an output signal when set to a predetermined one of its stable states; first means for setting said bistable elements to said one stable state; second means selectively responsive to a number-representing signal representative of one binary digit from a signal source to set the corresponding bistable element to the other of its stable states; and third means responsive to the output signal from a bistable element and a number-representing signal representative of another binary digit from the corresponding signal source to render said second means selectively responsive to said one binary digit-representing signal.

References Cited in the file of this patent

UNITED STATES PATENTS

| | | |
|---|---|---|
| 2,590,950 | Eckert et al. | Apr. 1, 1952 |
| 2,609,143 | Stibitz | Sept. 2, 1952 |
| 2,646,501 | Eckert et al. | July 21, 1953 |